United States Patent
Masse et al.

(10) Patent No.: US 6,990,570 B2
(45) Date of Patent: Jan. 24, 2006

(54) PROCESSOR WITH A COMPUTER REPEAT INSTRUCTION

(75) Inventors: Yves Masse, Biot (FR); Gilbert Laurenti, Saint Paul de Vence (FR); Alain Boyadjian, Vallauris (FR)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/410,730

(22) Filed: Oct. 1, 1999

(65) Prior Publication Data

US 2003/0093656 A1 May 15, 2003

(30) Foreign Application Priority Data

Oct. 6, 1998 (EP) ................................. 98402454
Oct. 6, 1998 (EP) ................................. 98402455

(51) Int. Cl.
G06F 15/00 (2006.01)
(52) U.S. Cl. ..................... 712/241; 712/232; 712/233
(58) Field of Classification Search ................ 712/233, 712/241

See application file for complete search history.

(56) References Cited

U.S. PATENT DOCUMENTS

| | | | | |
|---|---|---|---|---|
| 3,665,402 A | * | 5/1972 | Greenspan et al. .......... | 712/241 |
| 4,556,938 A | * | 12/1985 | Parker et al. ............... | 712/241 |
| 4,652,997 A | * | 3/1987 | Kloker ........................ | 712/241 |
| 4,713,749 A | * | 12/1987 | Magar et al. ............... | 712/241 |
| 5,056,004 A | | 10/1991 | Ohde et al. | |
| 5,101,484 A | * | 3/1992 | Kohn .......................... | 712/234 |
| 5,303,355 A | * | 4/1994 | Gergen et al. .............. | 712/226 |
| 5,392,437 A | | 2/1995 | Matter et al. | |
| 5,452,401 A | | 9/1995 | Lin | |
| 5,515,530 A | | 5/1996 | Eskandari | |
| 5,579,493 A | * | 11/1996 | Kiuchi et al. ............... | 712/207 |
| 5,596,760 A | | 1/1997 | Ueda | |
| 5,713,028 A | | 1/1998 | Takahashi et al. | |
| 5,732,234 A | | 3/1998 | Vassiliadis et al. | |
| 5,734,880 A | | 3/1998 | Guttag et al. | |
| 5,752,015 A | * | 5/1998 | Henry et al. ................ | 712/241 |
| 5,784,628 A | | 7/1998 | Reneris | |
| 5,842,028 A | | 11/1998 | Vajapey | |
| 5,898,866 A | * | 4/1999 | Atkins et al. ............... | 712/208 |

(Continued)

FOREIGN PATENT DOCUMENTS

EP    0 206 653 A2    12/1986

(Continued)

OTHER PUBLICATIONS

Pentium Processor Family Developer's Manual, vol. 3: Architecture and Programming Manual herein referred to as intel; Intel Corporation; 1995; pp. 4-28 to 4-31 and 18-7.*

(Continued)

*Primary Examiner*—Kakali Chaki
*Assistant Examiner*—William H. Wood
(74) *Attorney, Agent, or Firm*—Robert D. Marshall, Jr.; W. James Brady, III; Frederick J. Telecky, Jr.

(57) ABSTRACT

A processing engine, such as a digital signal processor, includes an execution mechanism, a repeat count register and a repeat count index register. The execution mechanism is operable for a repeat instruction to initialize the repeat count index register with the content of the repeat count register, and to modify the content of the repeat count register. The repeat instruction comprises two parts, the first of which initializes the repeat count index register and initiates repeat of a subsequent instruction, and the second part of which modifies the content of the repeat count register.

21 Claims, 11 Drawing Sheets

U.S. PATENT DOCUMENTS

| | | | |
|---|---|---|---|
| 5,960,210 A * | 9/1999 | Jin | 712/1 |
| 5,996,078 A | 11/1999 | Christensen et al. | |
| 6,145,076 A * | 11/2000 | Gabzdyl et al. | 712/241 |
| 6,282,633 B1 * | 8/2001 | Killian et al. | 712/208 |
| 6,842,895 B2 * | 1/2005 | Renard et al. | 712/22 |

FOREIGN PATENT DOCUMENTS

| | | |
|---|---|---|
| EP | 0 374 419 A2 | 6/1990 |
| EP | 0848208 A2 | 5/1998 |
| WO | WO 98/35301 | 8/1998 |

OTHER PUBLICATIONS

"The Microarchitecture of Superscalar Processors"; Smith, James E. and Sohi, Gurindar S.; Proceedings of the IEEE. vol. 83, No. 12, Dec. 1995; pp. 1609-1624.*

MC68030: Enhanced 32-Bit Microprocessor User's Manual Second Edition; Prentice Hall; 1989 Motorola; p. 2-8.*

"TMS320 DSP Product Family Glossary"; Texas Instruments, 1998.*

Uffenbeck, John; "Microcomputers and Microprocessors: The 8080, 8085, and Z-80 Programming, Interfacing, and Troubleshooting"; Prentice-Hall, Inc.; 1985; pp. 53-62 and 637-643.*

Stallings, "Computer Organization and Architecture: Principles of Structure and Function"; Macmillan Publishing Company, 1987, pp. 288-289.*

* cited by examiner

| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| INST. 1 | $PF_1$ | $F_1$ | $D_1$ | $AD_1$ | $AC_1$ | $R_1$ | $E_1$ | | | | |
| INST. 2 | | $PF_2$ | $F_2$ | $D_2$ | $AD_2$ | $AC_2$ | $R_2$ | $E_2$ | | | |
| INST. 3 | | | $PF_3$ | $F_3$ | $D_3$ | $AD_3$ | $AC_3$ | $R_3$ | $E_3$ | | |
| INST. 4 | | | | $PF_4$ | $F_4$ | $D_4$ | $AD_4$ | $AC_4$ | $R_4$ | $E_4$ | |
| INST. 5 | | | | | $PF_5$ | $F_5$ | $D_5$ | $AD_5$ | $AC_5$ | $R_5$ | |
| INST. 6 | | | | | | $PF_6$ | $F_6$ | $D_6$ | $AD_6$ | $AC_6$ | $R_6$ |
| INST. 7 | | | | | | | $PF_7$ | $F_7$ | $D_7$ | $AD_7$ | $AC_7$ |

| | STATE OF THE ART -1- | STATE OF THE ART -2- |
|---|---|---|
| DATA ORGANIZATION | AR1 --> MEMORY DATA INPUT ARRAY<br>AR2 --> MEMORY DATA INPUT ARRAY<br>AR3 --> MEMORY DATA INPUT ARRAY | AR1 --> MEMORY DATA INPUT ARRAY<br>AR2 --> MEMORY DATA INPUT ARRAY<br>AR3 --> MEMORY DATA INPUT ARRAY |
| ALGORITHM STRUCTURE | (i) AC1 = (*AR1+%) * (*AR2+)<br>(ii) AC1 += (*AR1+%) * (*AR2+)<br>(iii) (*AR3+) = HIGH (AC2)<br>(iv) \|\| AC2 = AC1 + (*AR2 - DR0) << 16<br>(v) DR0 -= #ITERATION_STEP<br>(vi) AC1 = (*AR1+%) * (*AR2+)<br>(vii) AC1 += (*AR1+%) * (*AR2+)<br>(viii) AC1 += (*AR1+%) * (*AR2+)<br>(ix) (*AR3+) = HIGH (AC2)<br>\|\| AC2 = AC1 + (*AR2 - DR0) << 16<br>DR0 -= #ITERATION_STEP | (i) @ INNER_COUNTER = #1-1<br>(ii) BLOCK_REPEAT_COUNTER = #NB_ITERATION-1<br>(iii) BLOCK_REPEAT<br>(iv) AC1 = (*AR1+%) * (*AR2+)<br>(v) REPEAT @INNER_COUNTER<br>(vi) AC1 += (*AR1+%) * (*AR2+)<br>(vii) (*AR3+) = HIGH (AC2)<br>(viii) \|\| AC2 = AC1 + (*AR2 - DR0) << 16<br>(ix) @INNER_COUNTER += #ITERATION_STEP<br>(x) DR0 -= #ITERATION_STEP<br>(xi) |
| CODE SIZE | 85 WORDS | 13 WORDS |
| CYCLES | $(N+7) \cdot N/2 = 85$ WHEN $N = 10$ | $(N+7) \cdot N/2 + 5 \cdot N + 6 = 141$ WHEN $N = 10$ |

PROCESSOR WITH A COMPUTER REPEAT INSTRUCTION

This application claims priority to S.N. 98402454.7, filed in Europe on Oct. 6, 1998 (TI-27686EU) and S.N. 98402455.4, filed in Europe on Oct. 6, 1998 (TI-28433EU).

FIELD OF THE INVENTION

The present invention relates to processing engines configurable to repeat program flow.

BACKGROUND OF THE INVENTION

It is known to provide for parallel execution of instructions in microprocessors using multiple instruction execution units. Many different architectures are known to provide for such parallel execution. Providing parallel execution increases the overall processing speed. Typically, multiple instructions are provided in parallel in an instruction buffer and these are then decoded in parallel and are dispatched to the execution units. Microprocessors are general purpose processor engines which require high instruction throughputs in order to execute software running thereon, which can have a wide range of processing requirements depending on the particular software applications involved. Moreover, in order to support parallelism, complex operating systems have been necessary to control the scheduling of the instructions for parallel execution.

Many different types of processing engines are known, of which microprocessors are but one example. For example, Digital Signal Processors (DSPs) are widely used, in particular for specific applications. DSPs are typically configured to optimise the performance of the applications concerned and to achieve this they employ more specialised execution units and instruction sets.

In a DSP or microprocessor, machine-readable instructions stored in a program memory are sequentially executed by the processor in order for the processor to perform operations or functions. The sequence of machine-readable instructions is termed a "program". Although the program instructions are typically performed sequentially, certain instructions permit the program sequence to be broken, and for the program flow to repeat a block of instructions. Such repetition of a block of instructions is known as "looping", and the block of instructions are known as a "loop". For certain processor applications, in particular signal processing, the processing algorithms require so-called "nested loop" computations. Nested loops are loops of program code which are contained within the body of an outer loop of a program code. Often, the inner loop is a single instruction which needs to be iterated a varying number of times dependent on the current step of the outerloop.

When performing a loop, memory access, for example to program memory, has to be performed in order to fetch the instructions to be repeated. Typically, the memory, such as the program memory, resides off chip and the memory access represents a considerable processor cycle overhead. This mitigates against power saving and fast processing at low power consumption, in particular for applications where program loops are likely to be utilized frequently.

The present invention is directed to improving the performance of processing engines such as, for example but not exclusively, digital signal processors.

SUMMARY OF THE INVENTION

In accordance with a first aspect of the invention there is provided a processing engine, comprising an execution mechanism. The processing engine also comprises a repeat count register and a repeat count index register. The execution mechanism is responsive to a repeat instruction to initialize the repeat count index register with the content of said repeat count register and to modify the content of said repeat count register.

In accordance with a second aspect of the invention there is provided a method for operating a processing engine comprising executing a repeat instruction. The repeat instruction is executed by i) initializing a repeat count index register with the content of a repeat count register, and ii) modifying said repeat count register.

Preferred embodiments in accordance with the first and second aspects of the invention provide improved processing throughput by initializing the repeat count index register and modifying the repeat count register in parallel, by combining them in a single instruction. Furthermore, since the repeat count index register is initialized from a register (repeat count register) memory access delays are reduced, and the repeat may be initiated more quickly.

Preferably, the processing engine is responsive to the said repeat instruction comprising first and second parts, and responsive to a first part to initialize said repeat count index register, and to said second part to modify the content of said repeat count register.

Preferably, the second part comprises a data instruction having an operand for modifying the content of said repeat count register.

More preferably, the data instruction comprises an arithmetic operation including said operand and said repeat count register content, suitably implemented by way of an Arithmetic Logic Unit.

The operand may be a constant value, or a register value which would provide flexibility in updating the repeat count register since the register could itself be updated with the result of another operation.

Suitably, the repeat count index register is initializable from program memory and/or the program and/or a processing register.

The execution mechanism repeats the execution of a subsequent instruction whilst the repeat count index register content satisfies a predetermined condition, which is generally that the register contents are not equal to zero. Typically, the content of the repeat count index register is decremented by one for each execution of the second instruction.

Generally, the processing engine comprises repeat count circuitry including said repeat count index register coupled to a decrement unit for decrementing the content of said repeat count index register, a comparator for comparing the content of said repeat count index with a predetermined value, and a control unit coupled to the output of said comparator to inhibit further execution of said second instruction for said content of repeat count index register corresponding to said predetermined value.

Typically, the execution mechanism comprises an instruction pipeline including a plurality of pipeline stages. The execution mechanism is adapted to be responsive at respective pipeline stages to initialize the repeat count index register and modify the content of the repeat count register. Preferably, the execution mechanism is responsive at an early stage, for example a decode stage of the pipeline, of the instruction pipeline to modify the repeat count index register for execution of the subsequent instruction.

In accordance with the preferred embodiments of the invention, fewer processing cycles are necessary in order to execute repeat cycles having the number of iterations for the next loop updated as part of the current repeat instruction. Consequently, there is a corresponding reduction in power consumption by the data processing apparatus. Therefore, embodiments of the invention are particularly suitable for use in portable apparatus, such as wireless communication devices. Typically, such a wireless communication device comprise a user interface including a display such as liquid crystal display or a TFT display, and a keypad or keyboard for inputting data to the communications device. Additionally, a wireless communication device will also comprise an antenna for wireless communication with a radio telephone network or the like.

Further aspects and advantages of the invention will become apparent from the following description.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 6 is a diagrammatic illustration of an example of operation of a pipeline in the processor of FIG. 1;

FIG. 9 shows two known algorithms for stepping through a data structure;

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

Figure 1:
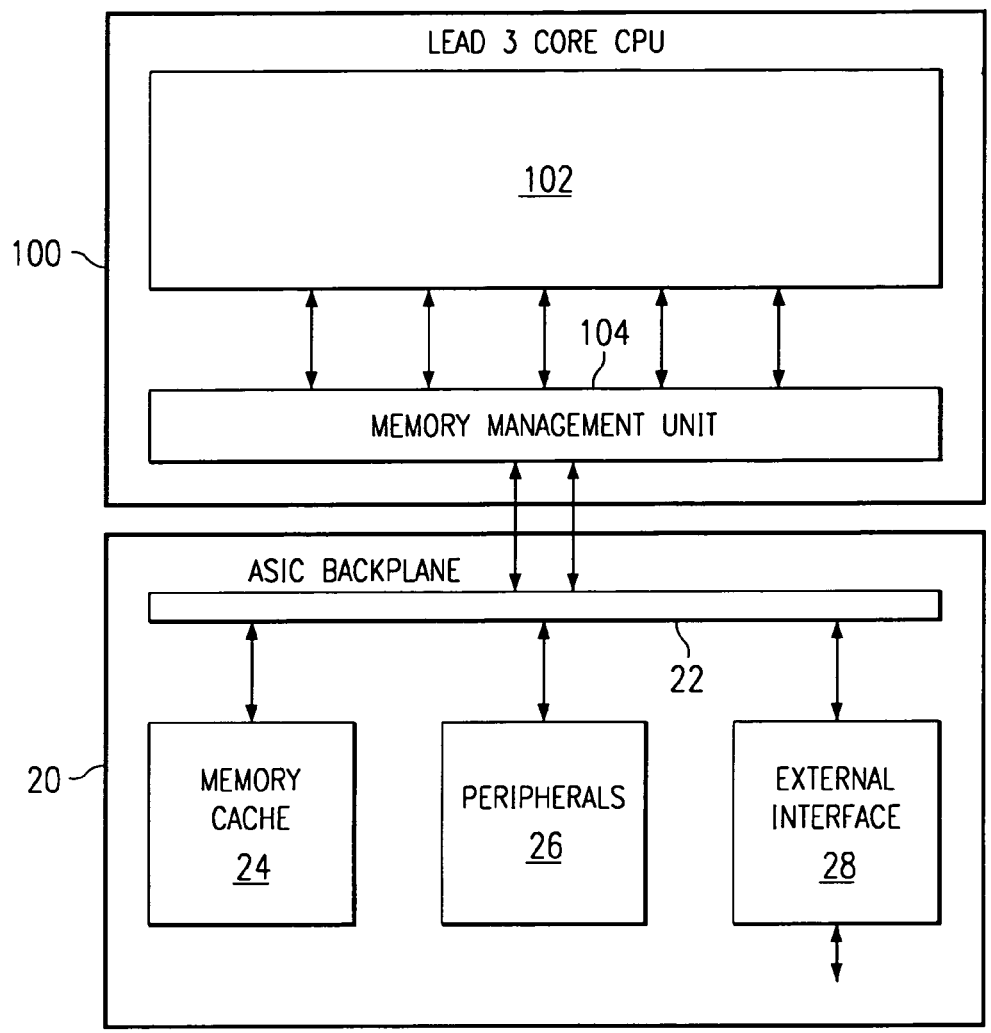
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 (TI-28433), which is incorporated herein by reference.

The basic architecture of an example of a processor according to the invention will now be described.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine, or a processor including the processing engine, could be implemented in one or more integrated circuits.

Figure 2:
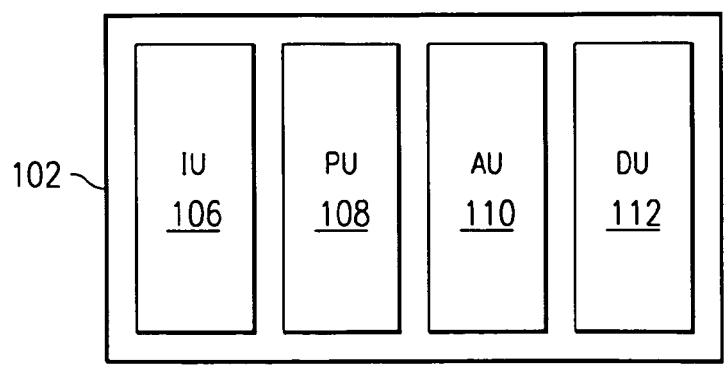
FIG. 2 is a schematic diagram of a core of the processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
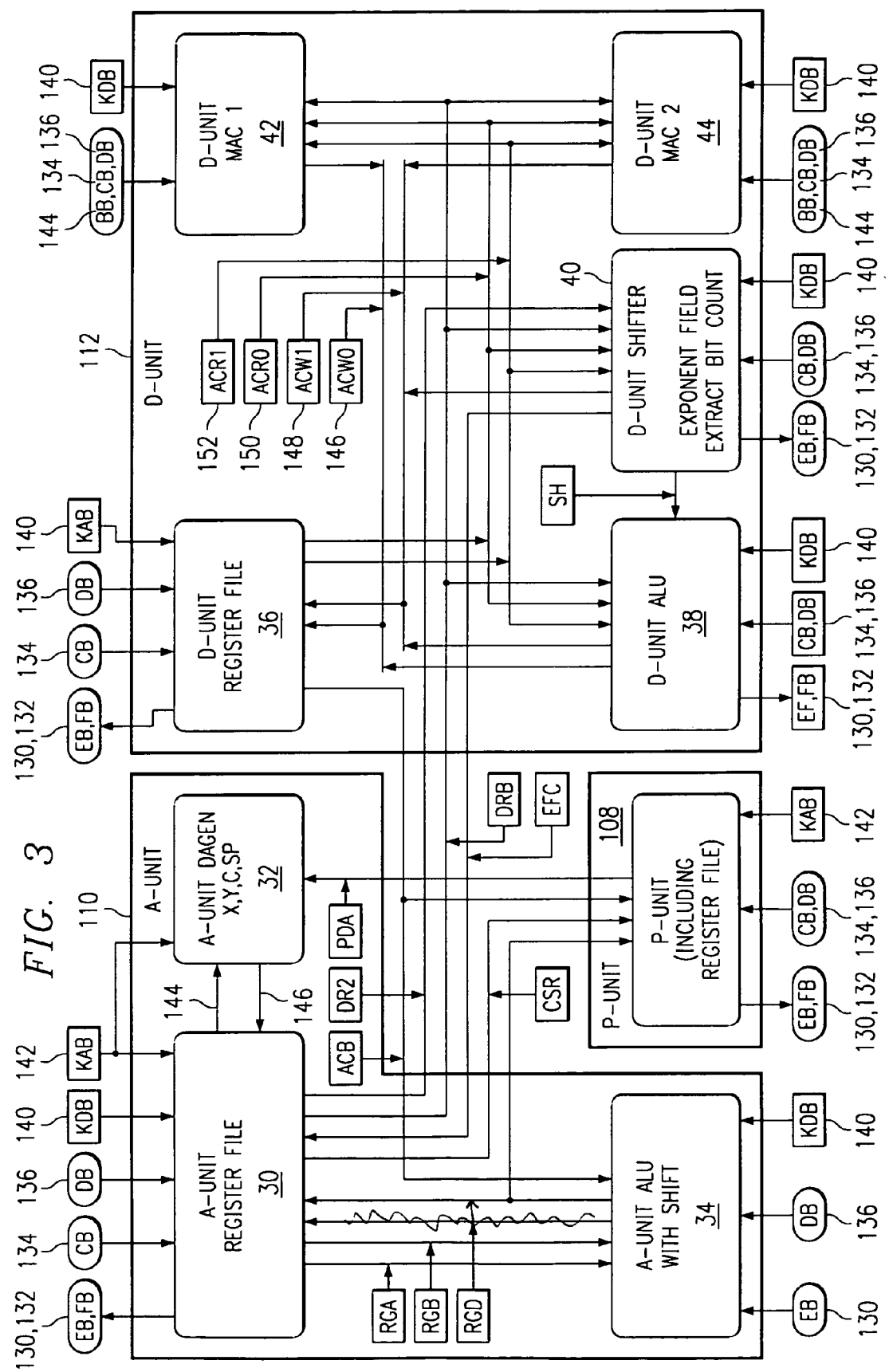
FIG. 3 is a more detailed schematic block diagram of various execution units of the core of the processor of FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
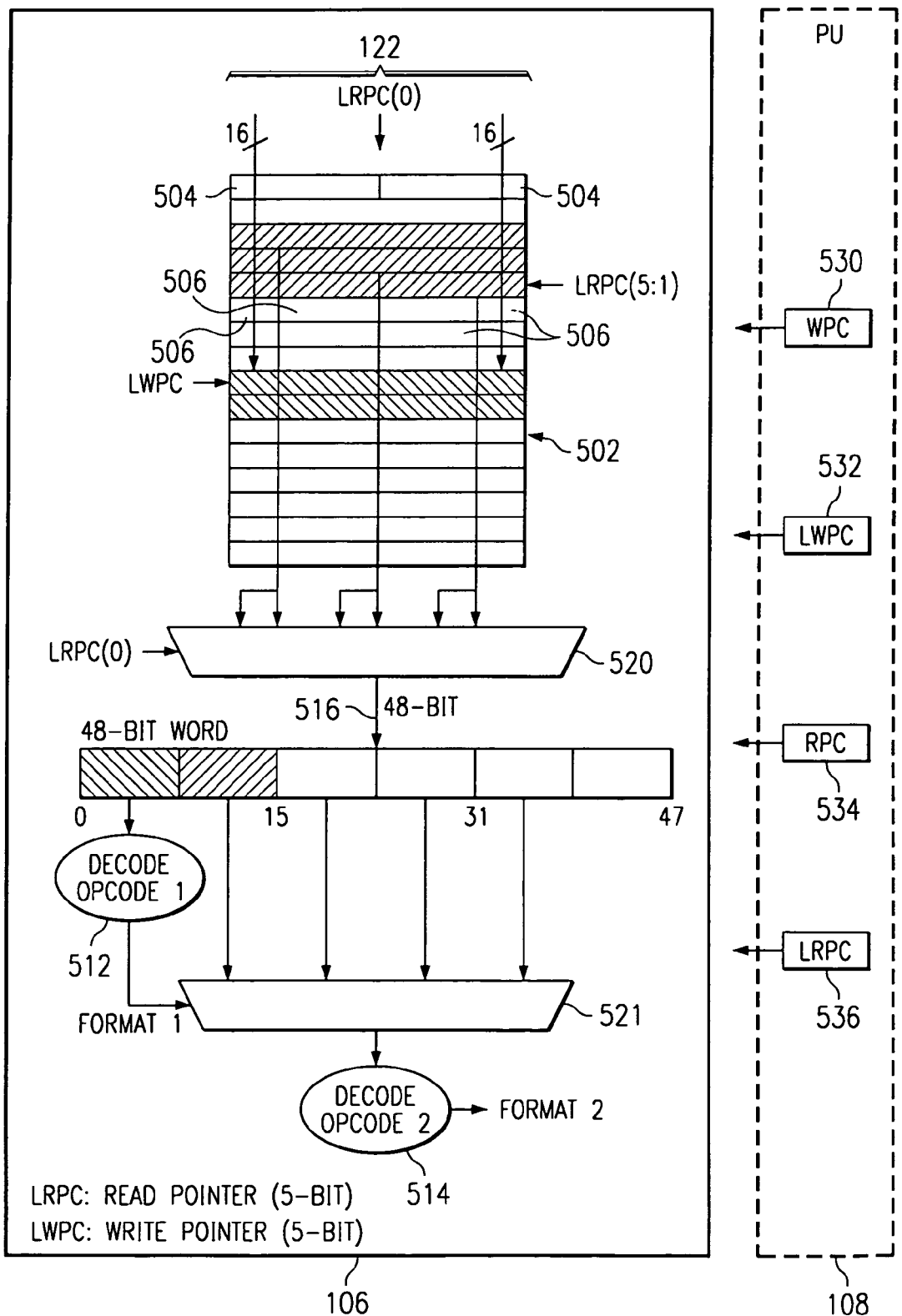
FIG. 4 is schematic diagram of an instruction buffer queue and an instruction decoder controller of the processor of FIG. 1.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder(s) 512 and 514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

Figure 5:
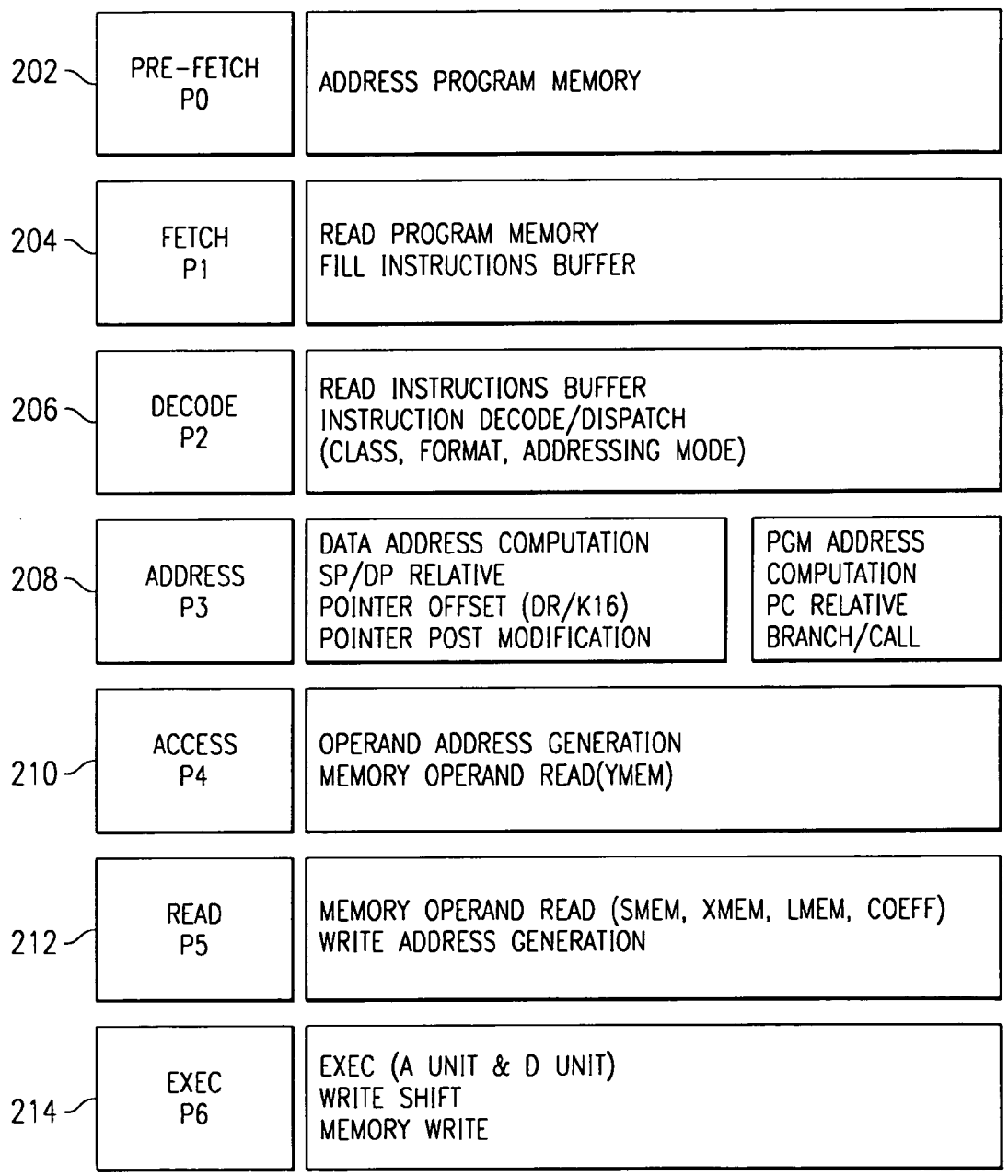
FIG. 5 is a representation of pipeline phases of the processor of FIG. 1.

The processor core 102 executes instructions through a 7 stage pipeline, the respective stages of which will now be described with reference to FIG. 5.

The first stage of the pipeline is a PRE-FETCH (P0) stage 202, during a which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump.

Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6 for a seven stage pipeline a total of 7 instructions may be processed simultaneously. For all 7 instructions 302–314, FIG. 6 shows them all under process in time period $T_7$. Such a structure adds a form of parallelism to the processing of instructions.

Figure 7:
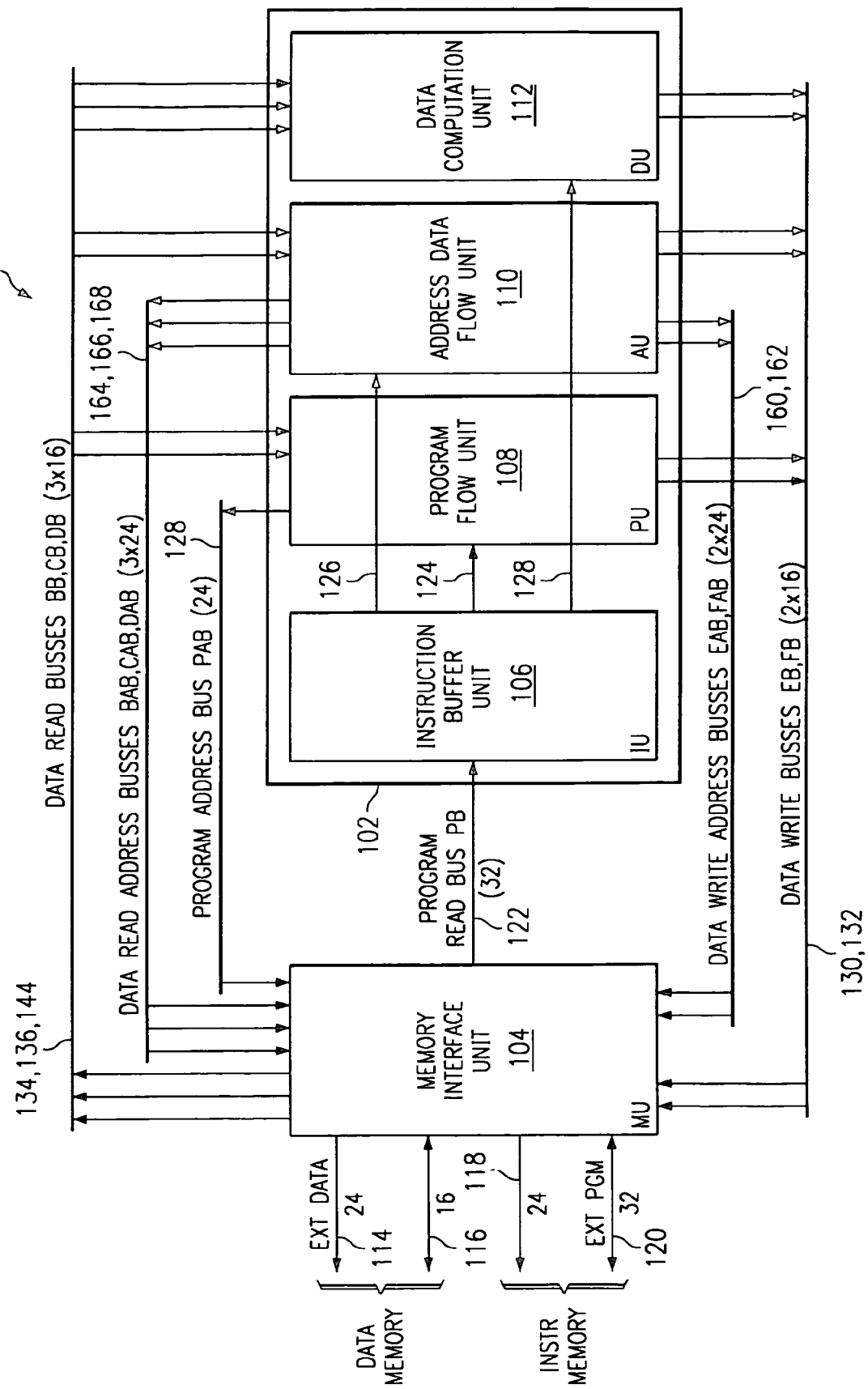
FIG. 7 is a schematic representation of the core of the processor for explaining the operation of the pipeline of the processor of FIG. 1.

As shown in FIG. 7, the present embodiment of the invention includes a memory management unit 104 which is coupled to external memory units (not shown) via a 24 bit address bus 114 and a bi-directional 16 bit data bus 116. Additionally, the memory management unit 104 is coupled to program storage memory (not shown) via a 24 bit address bus 118 and a 32 bit bi-directional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124, for forwarding branch instructions for example. Additionally, FIG. 7 represents the passing of data from the I Unit 106 to the A Unit 110 and the D Unit 112 at 126 and 128 respectively.

In general, an instruction for initiating a loop sets up the number of iterations of the loop. This may be done by setting a variable for the maximum number of iterations, that variable being decreased for each iteration and the iteration ceasing when a lower cut-off is reached, or vice versa. Optionally, a parameter such as "step" may be initialized before the loop in order to determine the step-size through which the iteration variable is stepped down from or up to its minimum or maximum value.

As mentioned in the introductory portion of the description, for certain processor applications, in particular signal processing, the processing algorithms require so-called "nested loop" computations. Often, the inner loop is a single instruction which needs to be iterated a varying number of times dependent on the current step of the outer loop. An example of such an algorithms is given below.

Algorithm (1):
for (j=1 to NUMBER_OF_ITERATION)
for (i=1 to initial_value+j*iteration_step)
single_cycle_function (x(i), y(j));

where j is the current step variable of the outer loop, and i is the current step level of the inner loop. The variable NUMBER_OF_ITERATION is the total number of repeats of the outer loop. Iteration step is the step-size for the inner loop. Single_cycle_function is a generic description for any suitable single cycle processor instruction or parallel executed instructions. As can be seen, the number of iterations of the inner loop is dependent on the current step (j) of the outer loop. The effects of this are diagrammatically illustrated in FIGS. 8A and 8B.

Figure 8A:
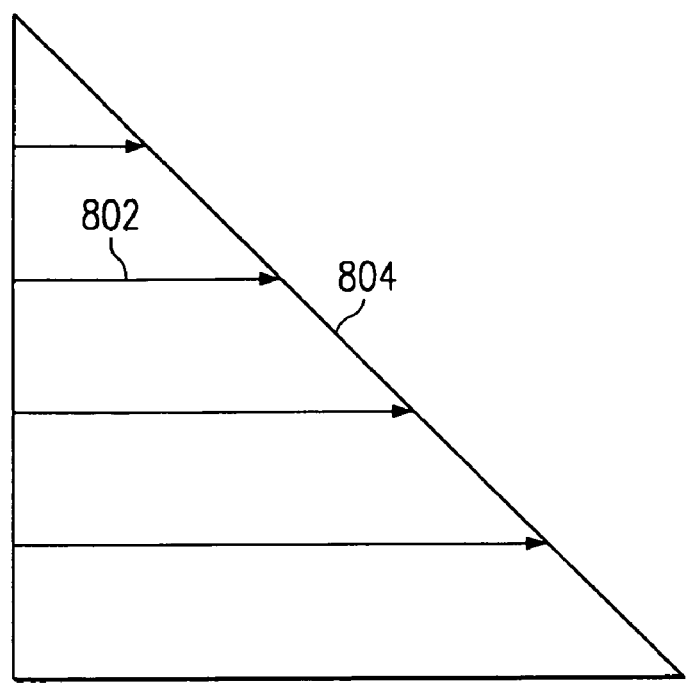
FIGS. 8A and 8B show the structure of various repeat instructions.
Figure 8B:
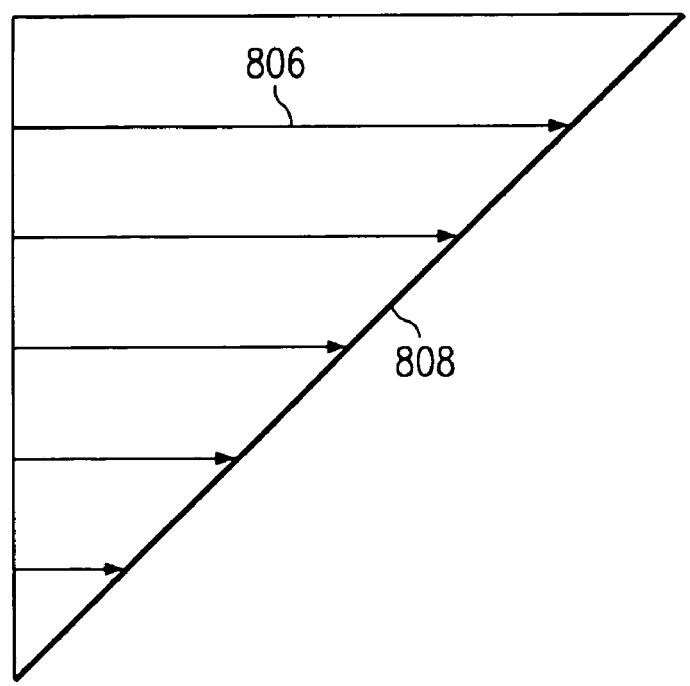

FIG. 8A shows the number of iterations 802 of the inner loop, increasing as the step position 804 of the outer loop increases, as would be the case for algorithm (1) above. Alternatively, algorithm (1) could be modified such that, j=NUMBER_OF_ITERATION to 1;

In which case the number of iterations 806 of the inner loop would decrease as the step position 808 of the outer loop decreased, as shown in FIG. 8B.

An example of applications where such algorithms may be applied are: the initialization phases of FIR/IIR filters; symmetrical matrix computations; and Levinson & Schurr-like recursions.

Hitherto, such algorithms have been coded "in-line" with the loop argument (NUMBER_OF_ITERATION) being part of the program code as a parameter or immediate constant value. This requires duplication of code and increases the code size overhead for the processor.

Optionally, a known loop structure is used where the loop iteration size parameter is a memory operand. Although such an algorithm uses a looped structure and therefore saves on code size, there is a processor cycle overhead since memory accesses are required. The processor cycle overhead occurs since the instruction pipeline stage where memory is read and the pipeline stage where the repeat counter register is initialized are different. This causes a latency in instruction execution which causes a redundant slot in the pipeline.

There is an increasing requirement for electronic apparatus, in particular portable electronic apparatus, to reduce power consumption. Furthermore, for portable electronic apparatus it is desirable to have as an efficient and small a program code size as possible in order to reduce the program memory size and/or increase the functionality of the portable electronic apparatus. The foregoing requirements are not satisfied by known loop methods.

By way of background description, known methods of implementing a single loop repeat shall now be described.

FIG. 9 of the drawings shows two known algorithms for stepping through a data structure or the like for repeating an operation on separate parts of the data structure. Referring now to the algorithm labelled "State of the Art-1", line ii) thereof represents the multiplication of two data elements located in data memory at positions pointed to by address registers AR1 and AR2. The "+" indicates that the address AR1 and AR2 are post-incremented after the results of the operation, and the "%" indicates that address AR1 is post-incremented in a circular addressing mode. The "*" indicates an indirect addressing mode. The result of the operation is stored in accumulator 1, AC1. Such an operation is known as a Multiply and Accumulate (MAC) operation. In line (ii) the data elements pointed to by addresses AR1 and AR2 are multiplied together and the result added to the contents of accumulator 1, AC1. Moving on to line (iii), the first part indicates that a high part (bits 31 to 16) of accumulator 2, AC2, are stored in the memory location pointed to by address AR3. The address AR3 is post incremented. The second part of line (iii) shows a parallel operation, indicated as parallel by "||", and in which the contents of AC2 are the results of a previous step. The data element pointed to by AR2 is added to the high contents (bits 31 to 16) of accumulator 1, AC1. Address pointer AR2 is post-decremented by the contents of data register DRØ. The data register contents, DRØ, are decremented by an iteration step value ready for the next operation on the data structure.

Operations (i) through (iv) are repeated for lines (v) through (ix). As can be seen from "State of the Art-1" instructions (ii) & (iii) are repeated twice explicitly in a first part, and three times in a second part. In this manner of in line coding, it is possible to step through a data structure in memory in steps corresponding to the value "iteration-step", and perform the same function at each step.

An algorithm such as "state of the Art-1" requires a low level of processor cycles, but requires a large amount of code. For example, 85 words of the 85 cycles for 10 repeats.

Referring now to the algorithm labelled "State of the Art-2" in FIG. 9, line (i) thereof initializes a memory variable directly accessible on the current memory page at the address represented by @inner-counter. Line (ii) is the initialization of a block_repeat_counter with the number of repeats for the block given by NB-ITERATION-1. At lines (iii) all the code within the braces at lines (iv) and (xi) will be repeated until the block_repeat_counter is zero. Line (v) performs the same operation as line (i) in "State of the Art-1", and line (vi) is a single instruction repeat statement responsive to which the repeat counter is fetched from memory address @inner-counter, and which will repeat line (vii). Lines (vii) and (viii) corresponds to lines (ii) and (iii) in "State of the Art-1". At line (ix) the variable stored at address @inner-counter is incremented by an amount given by the iteration step. Line (x) corresponds to line (iv) of "State of the Art-1". By utilizing nested repeat loops, the same effect as achieved by "State of the Art-1" may be achieved but with only 13 words of code for 10 repeats, for example. However, the number of processor cycles is relatively high at 141.

In accordance with a preferred embodiment of the invention, the processing engine is responsive to instructions relating to instruction repeat loop management. In a preferred embodiment the execution mechanism is responsive to a Computed Single Repeat (CSR) instruction comprising two parts. The format of the CSR instruction is given below:

repeat (*CSR*), *CSR*+=register_content;

where the op-code "repeat(CSR)" initiates a repeat loop which repeats a following instruction or pair of instructions executable in parallel for example, a number of times corresponding to the value of the content of a Computed Single Repeat (CSR) register. The second part of the instruction modifies the content of the CSR register by adding a value to the content. In the preferred embodiment the value is the content of an A unit 110 register, (DR0–DR3, AR0–AR7).

Table 1 shows the instruction format for four types of CSR instruction. The seven left most alphas "O" represent the repeat (CSR) instruction op-code. These are then followed by a parallel enable bit "E", which explicitly enables the repeat (CSR) instruction to be executed in parallel with another instruction. The third group of four alphas from the left represents the post-modification, if any, of the CSR register which may be a constant value or the contents of a register in the A unit 110 register file. The fourth group of four alphas is an op-code extension which is unused for the repeat (CSR) instruction.

TABLE 1

| Instruction Format | Alpha Code | Description |
| --- | --- | --- |
| OOOO OOOE xxxx oooo | repeat (CSR) | computed repeat with no modify |
| OOOO OOOE kkkk oooo | repeat (CSR), CSR+=k4 | computed repeat with post modify (positive step k4) |
| OOOO OOOE kkkk oooo | repeat (CSR), CSR−=k4 | computed repeat with post modify (negative step k4) |
| OOOO OOOE FSSS oooo | repeat (CSR), CSR+=DAx | computed repeat with DAx index post increment |

An example of an algorithm utilizing the repeat (CSR) instruction is given below:

```
BRC0 = #n
CSR=#initial_value
•
•
•
block repeat {
        repeat (CSR), CSR += 4
            AC1+=(*AR1+%)*(*AR2+)
};
•
•
•
``` where a block repeat counter BRC0 has an initial value n for a block repeat including the repeat (CSR) instruction.

Figure 10:
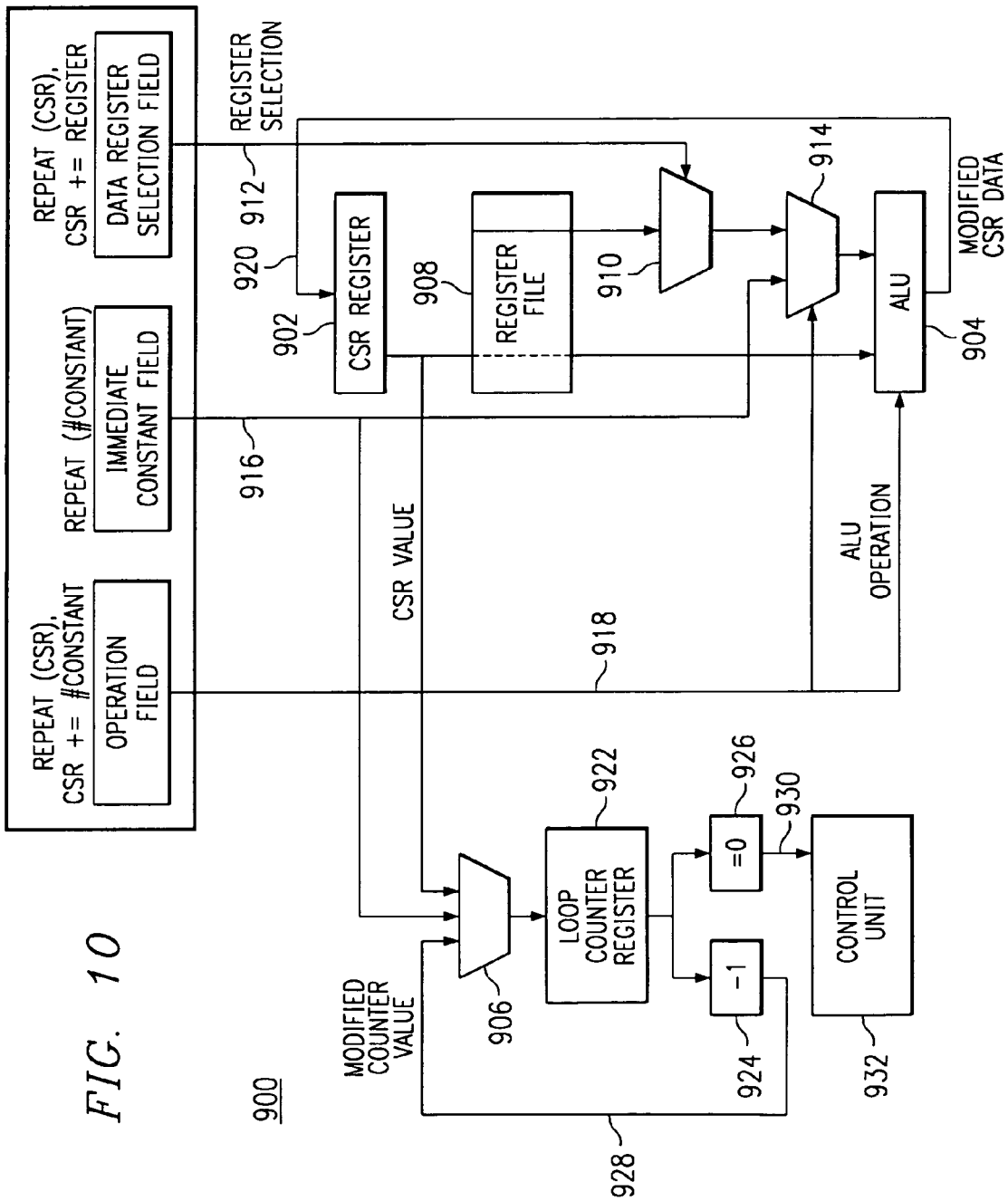
FIG. 10 is a schematic diagram of the circuitry used for an instruction in accordance with a preferred embodiment of the invention.

Referring now to FIG. 10, operation of the execution mechanism 900 for a repeat (CSR) instruction for a preferred embodiment of the invention will be described. Execution mechanism 900 comprises a CSR register 902, having an output coupled to an Arithmetic Logic Unit (ALU) 904 and a multiplexor 906. The CSR register may comprise a part of a Register File 908, which resides in the A Unit 110, and is directly coupled to the ALU 904, preferably the A Unit ALU. The Register File 908 is coupled to a gate 910 controllable by register select line 912, for selectively transferring the content of one of the registers in the Register File 908 to a multiplexor 914. Multiplexor 914 also receives an immediate constant value via data flow 916, and is controllable by control line 918 to selectively forward an immediate constant value or the content of one of the registers in the Register File 908 to the ALU 904. Control line 918 also controls operation of ALU 904.

In response to a repeat (CSR) instruction, the loop is initialized by passing the current contents of the CSR register 902 to the loop counter (repeat count index register) 922, via multiplexor 906.

Loop counter register 922 is coupled to a decrement unit 924 and a comparator unit 926. The content of the loop counter register 922, which represents the index count of the loop, is decreased by 1 in the decrement unit 924, and the modified counter value transferred via data flow 928 to an input of multiplexor 906. It will be clear to a person of ordinary skill in the art that an increment unit may be substituted for the decrement unit 924. Optionally, the decrement/increment unit may comprise a register whose content defines a step size for the loop counter.

Figure 11:
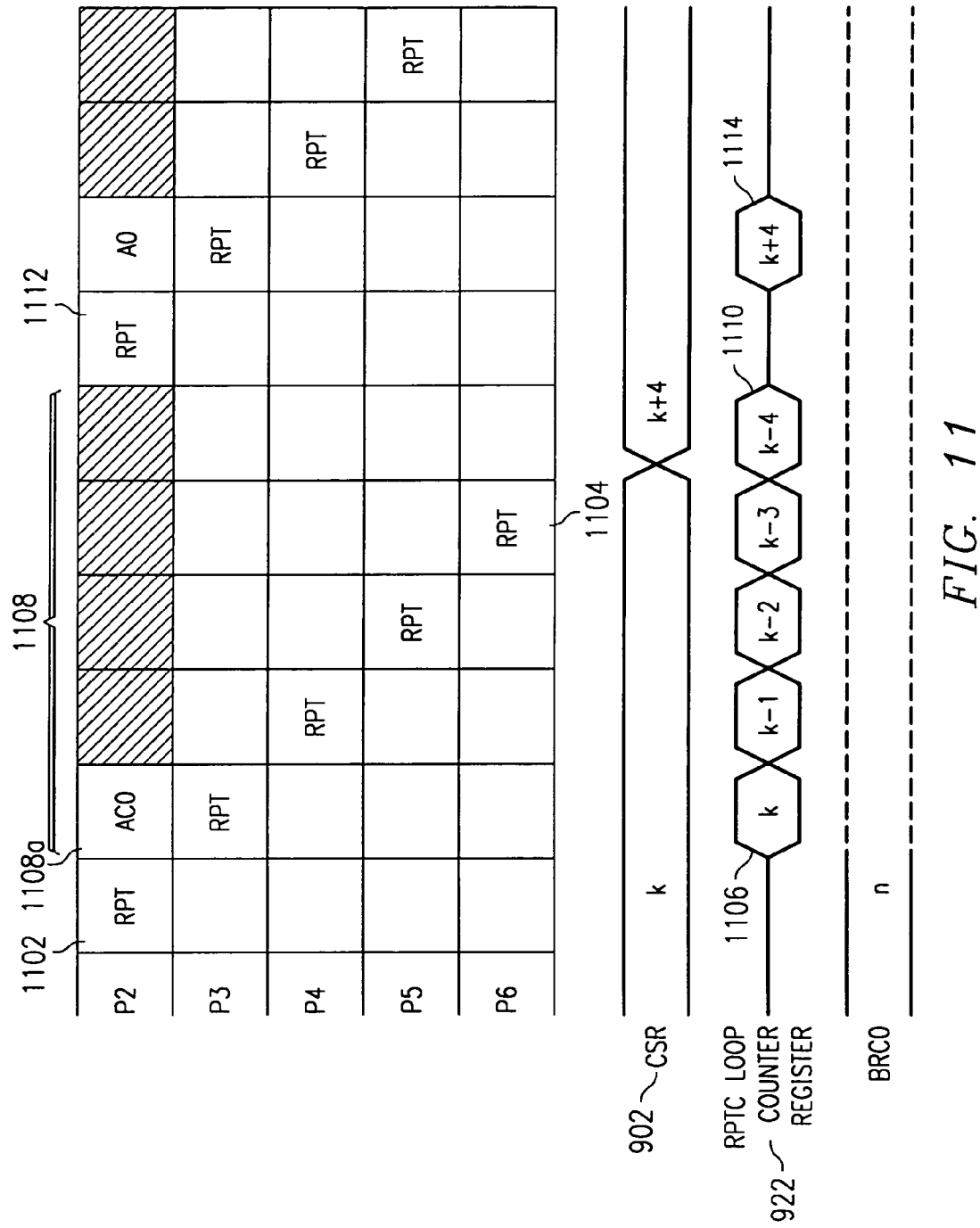
FIG. 11 illustrates the pipeline stages of an instruction in accordance with a preferred embodiment of the invention.

Referring now to FIG. 11 the instruction flow for a repeat (CSR) instruction will be described. The same nomenclature for the pipeline stages is used as was used in FIG. 5. A block repeat counter, BRCØ is initialized, n, prior to the repeat (CSR) instruction entering the instruction pipeline. The CSR register 902 is initialized before entering the repeat block with the repeat count for the first single repeat, for example k. On the decode stage P2, 1102, of the repeat (CSR) instruction pipeline, the loop counter register 922, RPTC, is updated from the CSR register 902 which gives value k for the first single repeat. During the Exec stage P6, 1104, of the repeat (CSR) instruction pipeline ALU 904 operation takes place, and the current contents of the CSR register 902 are added to either a constant value or other register contents (for example 4). The result is stored in the CSR register 902 at the end of the Exec stage 1104, thereby updating the register by post-modification. Modification of the CSR register 902, is by way of register (ALU 904) to register (CSR 902) operation, and is a generic register type operation. This is because the update of the CSR register is not timing critical as the repeat (CSR) instruction is typically nested within a block repeat, and the size of the block is sufficient for the update to take place during execution of the block instructions. In the present embodiment, the repeat latency is four cycles.

The loop counter (922 in FIG. 10) RPTC is initialized from the CSR register during the decode stage P2, 1102, of the repeat (CSR) instruction, and the value read into the loop counter register 922 at the end of the decode stage, shown 1106.

A single instruction represented by AC0 at 1108a is then repeated, 1108, in accordance with value k in the loop counter 922, with the loop counter value being tested, decremented and updated during the address stage P3 of the pipeline. When the single repeat has terminated, i.e. loop counter 922 value=0 at 1110, the rest of the repeat block is executed.

For the next entry into the repeat block 1112, the CSR register 902 value K+4 is loaded into the loop counter 922 at 1114, and then updated in the Exec stage of the pipeline ready for the next block repeat.

A preferred embodiment of a processing engine configured to operate in accordance with the foregoing provides an advantageous method and apparatus for providing increasing levels of iteration for repeat single instructions dependent on the iteration level of an outer loop.

Figure 12:
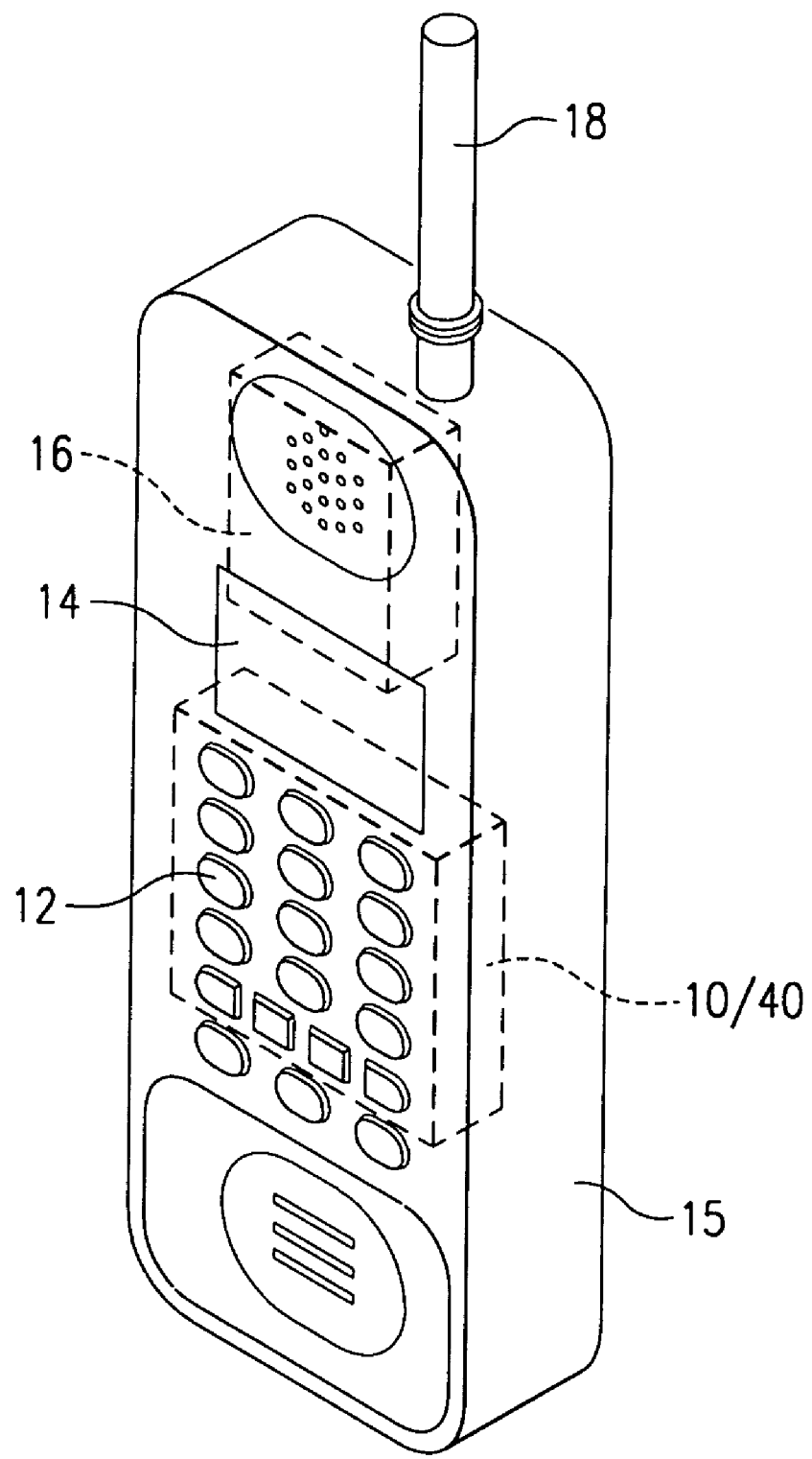
FIG. 12 is a schematic illustration of a wireless communication device suitable for incorporating in an embodiment of the invention.

FIG. 12 illustrates an exemplary implementation of a digital system embodying aspects of the present invention in a mobile telecommunications device, such as a mobile telephone with integrated keyboard 12 and display 14. Digital system 10 with a digital signal processor embodying aspects of the present invention packaged in an integrated circuit 40 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Integrated circuit 40 includes a plurality of contacts for surface mounting. However, the integrated circuit could include other configurations, for example a plurality of pins on a lower surface of the circuit for mounting in a zero insertion force socket, or indeed any other suitable configuration.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system having a processing engine, the processing engine comprising:

an execution mechanism, for repeatedly executing an instruction sequence including a repeat instruction and at least one instruction immediately subsequent to the repeat instruction in the instruction sequence;

a repeat count register for specifying a number of times that the execution mechanism is to execute the at least one subsequent instruction upon executing the repeat instruction;

a repeat count index register, having an input for receiving the contents of the repeat count register upon executing the repeat instruction; and circuitry for adjusting the content of the repeat count index register responsive to each execution of the subsequent instruction;

wherein the execution mechanism executes the repeat instruction, prior to executing the at least one subsequent instruction, by modifying the content of said repeat count register by an operand value responsive to each execution of the repeat instruction, so that the repeat count index register is initialized with modified contents of the repeat count register each time the repeat instruction is executed.

2. The processing engine according to claim 1, further comprising a data register for storing the operand value, and coupled to the execution mechanism.

3. The processing engine according to claim 2, wherein said execution mechanism comprises an arithmetic logic unit for receiving the content of said repeat count register and modifying said content in accordance with said operand value.

4. The processing engine according to claim 3, wherein the adjusting circuitry comprises:
a decrement unit for decrementing the content of said repeat count index register,
and further comprising:
a comparator for comparing the content of said repeat count index with a predetermined value, and
a control unit coupled to the output of said comparator to inhibit further execution of said subsequent instruction for said content of repeat count index register corresponding to said predetermined value.

5. The processing engine according to claim 4, wherein said predetermined value is zero.

6. The processing engine according to claim 5, wherein the execution mechanism further comprises an instruction pipeline including a plurality of pipeline stages;
wherein the adjusting circuitry is responsive at an early stage of said instruction pipeline to modify the content of the repeat count index register for execution of said subsequent instruction, and wherein the execution mechanism is responsive at a terminal stage of said instruction pipeline to modify the content of said repeat count register.

7. The processing engine according to claim 1, wherein the execution mechanism is responsive to said repeat instruction to initiate repeat of a subsequent instruction dependent on the content of said repeat count index register.

8. The processing engine according to claim 7, wherein said execution mechanism is further responsive to said repeat instruction to repeat execution of said subsequent instruction for the content of said repeat count index register satisfying a predetermined criterion.

9. The processing engine according to claim 8, wherein said content of said repeat count index register is decremented for each execution of said subsequent instruction.

10. The processing engine according to claim 8, wherein said predetermined criterion is said repeat count index register content not equal to zero.

11. The processing engine according to claim 7, wherein said subsequent instruction comprises at least two instructions executable in parallel.

12. The digital system of claim 1 being a cellular telephone, further comprising:
an integrated keyboard connected to the processor via a keyboard adapter;
a display, connected to the processor via a display adapter;
radio frequency (RF) circuitry connected to the processor; and
an aerial connected to the RF circuitry.

13. A method for operating a processing engine to execute a repeat instruction, the method comprising the steps of:
i) initializing a repeat count index register with the content of a repeat count register, and
ii) repeatedly executing a set of instructions a number of times so long as the contents of said repeat count index register satisfy a predetermined criterion, iii) modifying said content of said repeat count index register for each repeated execution of said set of instructions, iv) after the initializing step, and during the repeatedly executing step, modifying the contents of said repeat count register, and v) repeating execution of the repeat instruction by repeating steps i, ii, iii, and iv at least one time, such that each time execution of the repeat instruction is repeated, the repeat count index register is initialized with the content of the repeat count register as modified in the previous modifying step.

14. The method according to claim 13, wherein said repeat instruction comprises first and second parts, step i) being executed responsive to a first part of said repeat instruction, and step iv) being executed in response to a second part of said repeat instruction.

15. The method according to claim 14, step ii) further comprising accessing a data register comprising said second part and having an operand for modifying the content of said repeat count register.

16. The method according to claim 15, further comprising the step of performing an arithmetic operation on said operand and said repeat count register content.

17. The method according to claim 16, further comprising the step of adding a data value to the content of said repeat count register for modifying the content thereof.

18. The method according to claim 13 and operable for said set of instructions including at least two instructions, the method further comprising executing said at least two instructions in parallel.

19. A method for operating a processing engine to perform a nested loop by repeating a computed repeat instruction to control looping, comprising the steps of:
initializing a block count parameter to control a number of iterations for an outer loop;
executing the computed repeat instruction once for each iteration of the outer loop, the computed repeat instruction having a computed loop count parameter to control an inner loop;
executing a set of instructions a number of times in response to the computed loop count parameter for each iteration of the inner loop; and
wherein execution of the computed repeat instruction comprises the steps of:
i) initializing a repeat count index register with the computed loop count parameter;
ii) modifying the computed loop count parameter as specified by a field in the computed repeat instruction; and
iii) repeatedly executing the set of instructions in accordance with the content of the repeat count index register;
wherein the step of modifying the computed loop count parameter is performed during the step of repeatedly executing the set of instructions.

20. The method of claim 19, wherein the field in the computed repeat instruction contains an increment or decrement value or points to a register that contains the increment or decrement value.

21. The method of claim 19, wherein the step of initializing the repeat count index uses a value of the computed loop count parameter modified during a preceding execution of the repeat instruction.

* * * * *